Patented June 6, 1933

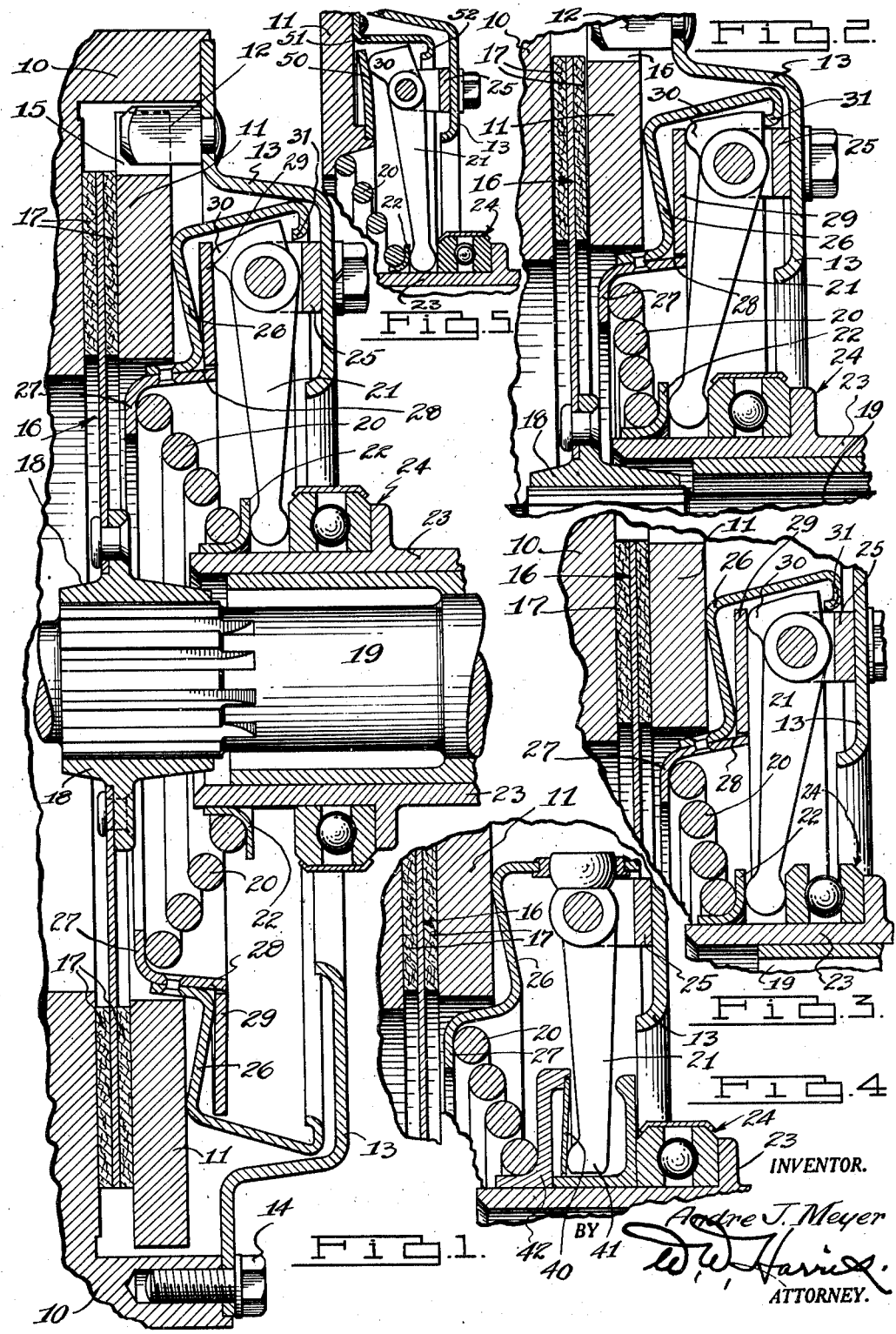

1,912,649

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

CLUTCH

Application filed December 19, 1930. Serial No. 503,348.

My invention relates to clutches and more particularly to improvements to clutches of the non-grabbing type preferably employing a substantially flat driven element having substantially a full surface contact with the driving element during the clutching action though the principle of my invention may be advantageously employed with clutch devices in which a variable surface contact is had between the driving and driven elements.

Smoothness in clutching action is quite desirable in clutch devices employed with automobiles and other like vehicles, and others have sought to produce non-grabbing and non-chattering clutch devices by progressively increasing the contacting surface area between the driving and driven elements of the clutch during the clutch engaging action which have given fairly good results. However, it has been found that such clutch devices are subjected to uneven wear because some portions of the clutch facings are subjected to more wear than other portions, with the result that frequent adjustments or replacements of worn parts are necessary to maintain the clutch in working order and as wear takes place the efficiency of the clutch is materially decreased. Clutches employed with trucks and busses are subjected to excessive wear, and clutches of the aforesaid character do not give satisfactory service with this type of vehicle.

It is the object of my present invention to provide a relatively simple, economically manufactured clutch device having generally improved clutching characteristics.

It is a further object of my invention to construct an improved type of clutch for use in various types of machines, automobiles and other like vehicles in which wear is reduced to a minimum, thereby providing a clutch in which frequent adjustments or replacements of worn parts to maintain the clutch in working order is unnecessary.

Another object of my invention is to construct a clutch having non-grabbing and non-chattering characteristics by providing a structure including driving and driven elements which are preferably engaged in full surface contact during the clutching action and by providing means associated therewith to build up the clutching pressure during the clutching action for effecting a gradual engagement of the driving and driven elements of the clutch.

A further object of my invention is to construct an improved type of clutch for the purpose specified by providing yielding means associated with the lever means of the pressure transmitting means for transmitting a substantially uniformly increasing clutching pressure to the driving element of the clutch assembly.

For a more detailed understanding of my invention reference may be had to the accompanying drawing illustrating preferred embodiments of my invention, and in which:

Figure 1 is a longitudinal sectional view of a clutch constructed in accordance with my invention, showing the driving and driven elements fully engaged.

Figure 2 is a fragmentary longitudinal sectional view thereof showing the driving and driven elements fully disengaged, Figure 3 is a fragmentary longitudinal sectional view thereof showing an intermediate position of the driving and driven elements, Figure 4 is a fragmentary longitudinal sectional view of a modified construction, and Figure 5 is a fragmentary longitudinal sectional view illustrating a further modified construction.

In general a clutch device adapted for use with automobiles or other like vehicles consists of driving and driven means and driving and driven elements respectively connected in driving engagement with the driving and driven means, a suitable source of energy supply being utilized for imparting relative movement to the driving and driven elements for clutch engaging or disengaging the action.

In automobiles or other like vehicles, an engine flywheel 10 is generally employed as a driving means, a driving element or pressure plate 11 being connected with said flywheel by means of the driving lugs 12 carried by the cover plate 13 which is secured to said flywheel 10 by bolts or other suitable fastening devices 14, said driving lugs engaged in slots 15 carried by the pressure plate 11. A driven element or clutch disc 16 is disposed between the pressure plate 11 and flywheel 10, said clutch disc being provided with clutch facings 17 adapted for frictional engagement with the said flywheel and pressure plate, the clutch disc being also provided with a hub 18 splined or otherwise connected with a driven means or shaft 19.

A spiral coil spring 20 is employed in the illustrated embodiments of my invention to provide the necessary energy for engaging the driven element or clutch disc 16 with the driving element or pressure plate 11, and said flywheel 10. In the illustrated embodiment of my invention (Figures 1, 2, 3 and 5) the spring 20, which is preferably termed a primary yielding means, acts on the inner ends of a plurality of levers 21, a spring retainer or collar 22 being preferably interposed between the lever means and spring, said collar being preferably carried on a sleeve 23 of the clutch actuating means or collar 24. The lever means is preferably fulcrumed to the cover plate 13, said cover plate being provided with brackets or other suitable fulcrum members 25 to which the levers are pivoted. As illustrated in Figures 1, 2 and 3, a thrust member 26 is provided which is connected or otherwise associated with the driving element or pressure plate 11 and is adapted to engage substantially the central zone of the said pressure plate, the inner edge of this annular thrust member preferably providing an abutment 27 for the spring 20. Thus one end of the spring acts on the lever means while the other end thereof engages the abutment 27. I preferably provide the thrust member with this spring abutment but the driving element may be constructed, if so desired (see Figure 5), as to provide an abutment, or a separate abutment may be provided which is carried by the cover plate 13 as in my prior application, Serial No. 502,189 filed December 13, 1930. However, in the present illustrated embodiment of my invention the thrust member carries the said spring abutment and the said thrust means is also preferably provided with an annular seat portion 28 adapted for supporting a secondary yielding means or spring annulus 29. The said seat portion 28 carried by the thrust member is preferably arranged to engage the inner peripheral portion of the secondary yielding means or spring annulus 29 and the levers are each provided with a striker or lug portion 30 adapted for engagement with the spring annulus 29 adjacent the outer peripheral portion thereof. Thus the pressure of the primary spring 20 may be transmitted to the driving element 11 of the clutch through the lever means 21, the spring annulus 29 which engages the levers, and the thrust member 26 interposed between the spring annulus and driving element 11. The spring annulus 29 is thus located in position by the seat portion 28 against radial displacement but freely movable relative to the lever ends 30, which engage the outer peripheral portion of the spring annulus, and relative to the thrust member 26, which is engaged by the inner peripheral portion of the spring annulus. This annulus moves from its normal released flat condition when the clutch is disengaged (see Fig. 2) to a frusto-conical position when the clutch is fully engaged (see Fig. 1). As the spring annulus 29 deflects, its stiffness progressively increases as it acquires the load of the primary yielding means 20 until the annulus transmits the full load of spring 20 by reason of its resilience.

The device illustrated in Figures 1, 2 and 3 is operated as hereinafter described to effect a gradual engagement of the driving and driven elements of the clutch. Starting with Figure 2 with the clutch parts disengaged, it will be noted that the primary spring is compressed and the back of each lever bears on the return bent rib or flange 31 carried by the thrust member thereby holding the thrust member in a retracted position freeing the driven element from driving engagement with the driving element. As the clutch pedal (not shown) is actuated the force of the spring 20 is released and applied to the inner end of the levers thereby actuating the same and because of the contacting relation between the outer end of the lever, the spring annulus, the thrust member and the driving element, the said driving element is moved into contact with the driven element without appreciably deflecting the spring annulus through which said force acts. Thus at the moment when initial contact is made between the driving and driven elements very little pressure or practically zero pressure is transmitted between the driving and driven elements.

When additional forces of the primary spring are released to effect a final clutching action, the additional pressure transmitted through the levers begins to deflect the secondary yielding means or spring annulus, the pressure being thereby built up in the spring annulus and as a result a substantially uniformly increasing pressure is transmitted to the driving element or clutch plate effecting a gradual clutching engagement of said clutch elements until the same are fully engaged, as shown in Figure 1 where the ultimate engaging position is illustrated.

It may be noted that the spring annulus is balanced at full clutching position and therefore a substantially uniformly increasing pressure is transmitted substantially throughout the range of the clutching action.

On de-clutching, the spring 20 is compressed and the levers are positively actuated by reason of their contact with the clutch releasing collar 24, and the first part of the de-clutching action relieves the pressure on the secondary yielding means or spring annulus, thereby substantially uniformly decreasing the pressure applied on the pressure plate and gradually disengaging the driving and driven elements of the clutch. When the transmitted pressure has been decreased to zero, further movement positively retracts the thrust member effecting a complete disengagement of the clutch elements. When the thrust member is rigidly attached to the pressure plate 11, the pressure plate is also positively retracted.

In Figure 4 I have illustrated a modified construction wherein the secondary yielding means, preferably consisting of a spring annulus 40, is interposed intermediate the inner end 41 of the lever means and the annular thrust member 42 slidably supported on the sleeve 23 of the clutch releasing means, the primary spring 20 bearing against this thrust member 42. Thus the force of the primary spring 20 is yieldingly transmitted to the levers through the above described yielding secondary means 40. The lever means multiplies the pressure of spring 20, since the said spring acts on the long arm of the said lever means. Thus the total pressure transmitted through the spring annulus 40 is considerably less than the total pressure transmitted through the spring annulus 29 illustrated in Figures 1 to 3 inclusive wherein the annulus 29 takes the whole multiplied pressure that is transmitted to the driving element 11. The spring annulus 40 may therefore be constructed of thinner or more flexible material in comparison with annulus 29.

In both constructions the pressure is transmitted through the pressure multiplying lever means, the secondary yielding means being associated with said lever means and preferably arranged in actual contacting relation therewith.

In Figure 5 illustrating a further modification the secondary yielding means preferably shown as a spring annulus 50 is supported directly on the driving element or pressure disc 11, and no thrust member is interposed between the spring annulus and pressure plate, the forwardly extending lug carried by the lever means acting on the spring annulus and preferably contacting therewith. In the illustrated embodiment of my invention shown in Figure 5, I provide a thrust member 51 which is preferably rigidly attached to the pressure plate and provided with an inwardly return bent flange 52 adapted for engagement with the rear part of the levers in order to positively retract the driving element or pressure plate on releasing the clutch.

I have provided a very compact clutch device suitable for installation in all types of vehicles and machines, which can be very economically manufactured, and which gives reliable performance under all conditions. The construction of the device is such that the clutch engaging elements always gradually engage throughout the life of the clutch.

It will be apparent to those skilled in the art to which my invention pertains that various modifications and changes may be made therein without departing from the spirit of my invention or from the scope of the appended claims.

What I claim as my invention is:

1. In a clutch, the combination of driving and driven elements, lever means, primary yielding means for loading one end of said lever means, and a spring annulus disposed intermediate said primary yielding means and lever and actuated in response to said primary yielding means for transmitting a substantially uniformly increasing pressure to said driving element.

2. In a clutch having driving and driven elements, one of said elements being movably engageable and disengageable with the other to effect clutch engagement and disengagement, thrust means associated with said driving element, and means for moving said movable element including lever means, primary yielding means for loading said lever means, and secondary yielding means intermediate said lever means and thrust means and actuated in response to said primary yielding means for transmitting a substantially uniformly increasing clutching pressure to said driving element, and means engageable with said lever means for positively disengaging said driving and driven elements.

3. In a clutch, the combination of a driving element, a driven element, driving and driven means respectively connected in driving relation with said driving and driven elements, lever means having one end thereof adapted to actuate said driving element, primary yielding means adapted to actuate the other end of said lever means, and a spring annulus actuated from a normally substantially flat condition to substantially frusto-conical condition in response to said primary yielding means for effecting a gradual engagement between said driving and driven elements, said spring annulus engaging said lever means.

4. In a clutch, the combination of a driving element, a driven element, driving and driven means respectively connected in driving relation with said driving and driven elements, lever means having one end thereof adapted to actuate said driving element, primary yielding means adapted to actuate the other end of said lever means, and a spring annulus actuated from a normally substantially flat condition to substantially frusto-conical condition in response to said primary yielding means for effecting a gradual engagement between said driving and driven elements, said spring annulus being positioned intermediate the driving element and said lever means.

5. In a clutch, the combination of a driving element, a driven element, driving and driven means respectively connected in driving relation with said driving and driven elements, lever means having one end thereof adapted to actuate said driving element, primary yielding means adapted to actuate the other end of said lever means, and a spring annulus actuated from a normally substantially flat condition to substantially frusto-conical condition in response to said primary yielding means for effecting a gradual engagement between said driving and driven elements, said lever means acting on the outer peripheral portion of said spring annulus.

6. In a clutch, the combination of a driving element, a driven element, driving and driven means respectively connected in driving relation with said driving and driven elements, lever means having one end thereof adapted to actuate said driving element, primary yielding means adapted to actuate the other end of said lever means, and a spring annulus actuated from a normally substantially flat condition to substantially frusto-conical condition in response to said primary yielding means for effecting a gradual engagement between said driving and driven elements, said lever means acting on the outer peripheral portion of said spring annulus, said spring annulus having an inner peripheral portion about which said spring annulus is flexed.

7. In a clutch, the combination of a driving element, a driven element, driving and driven means respectively connected in driving relation with said driving and driven elements, lever means having one end thereof adapted to actuate said driving element, primary yielding means adapted to actuate the other end of said lever means, and a spring annulus actuated from a normally substantially flat condition to substantially frusto-conical condition in response to said primary yielding means for effecting a gradual engagement between said driving and driven elements, said spring annulus being disposed intermediate said primary yielding means and the last said end of said lever means.

8. In a clutch, the combination of a driving element, a driven element, driving and driven means respectively connected in driving relation with said driving and driven elements, lever means having one end thereof adapted to actuate said driving element, primary yielding means adapted to actuate the other end of said lever means, and a normally flat secondary spring member actuated in response to said primary yielding means for effecting a gradual engagement between said driving and driven elements, said secondary spring member engaging said lever means.

9. In a clutch, the combination of a driving element, a driven element, driving and driven means respectively connected in driving relation with said driving and driven elements, lever means having one end thereof adapted to actuate said driving element, primary yielding means adapted to actuate the other end of said lever means, and a normally flat secondary spring member actuated in response to said primary yielding means for effecting a gradual engagement between said driving and driven elements, said secondary spring member engaging said lever means, said secondary spring member being disposed intermediate said primary yielding means and the last said end of said lever means.

10. In a clutch, the combination of a driving element, a driven element, driving and driven means respectively connected in driving relation with said driving and driven elements, lever means having one end thereof adapted to actuate said driving element, primary yielding means adapted to actuate the other end of said lever means, and a normally flat secondary spring member actuated in response to said primary yielding means for effecting a gradual engagement between said driving and driven elements, said secondary spring member being disposed intermediate said primary yielding means and the last said end of said lever means.

11. In a clutch, the combination of a driving element, a driven element, driving and driven means respectively connected in driving relation with said driving and driven elements, lever means having one end thereof adapted to actuate said driving element, a thrust member for moving said driving element, primary yielding means, said lever means actuated by said primary yielding means, and a spring annulus interposed intermediate said thrust member and said lever means, said annulus deflected into positions of increasing stiffness in response to said primary yielding means for effecting a gradual engagement between said driving and driven elements.

12. In a clutch, the combination of a driving element, a driven element, driving and driven means respectively connected in driving relation with said driving and driven elements, lever means having one end thereof adapted to actuate said driving element, a thrust member for moving said driving element, primary yielding means, said lever means actuated at one end thereof by said primary yielding means, and a spring annulus interposed intermediate said thrust member and said lever means at the other end thereof, said annulus deflected into positions of increasing stiffness in response to said primary yielding means for effecting gradual engagement between said driving and driven elements.

13. In a clutch, the combination of a driving element, a driven element, driving and driven means respectively connected in driving relation with said driving and driven elements, lever means having one end thereof adapted to actuate said driving element, a thrust member for moving said driving element, primary yielding means, said lever means actuated by said primary yielding means, and a spring annulus interposed intermediate said thrust member and said lever means, said annulus deflected into positions of increasing stiffness in response to said primary yielding means for effecting a gradual engagement between said driving and driven elements, said primary yielding means also acting on said thrust member.

14. In a clutch, the combination of a driving element, a driven element, driving and driven means respectively connected in driving relation with said driving and driven elements, lever means having one end thereof adapted to actuate said driving element, a thrust member for moving said driving element, primary yielding means, said lever means actuated at one end thereof by said primary yielding means, and a spring annulus interposed intermediate said thrust member and said lever means at the other end thereof, said annulus deflected into positions of increasing stiffness in response to said primary yielding means for effecting gradual engagement between said driving and driven means, said primary yielding means also acting on said thrust member.

15. In a clutch, the combination of a driving element, a driven element, driving and driven means respectively connected in driving relation with said driving and driven elements, lever means having one end thereof adapted to actuate said driving element, a thrust member for moving said driving element, primary yielding means, said lever means actuated at one end thereof by said primary yielding means, and a spring annulus interposed between but separate from said thrust member and lever means.

16. In a clutch, the combination of a driving element, a driven element, driving and driven means respectively connected in driving relation with said driving and driven elements, lever means having one end thereof adapted to actuate said driving element, a thrust member for moving said driving element, primary yielding means, said lever means actuated at one end thereof by said primary yielding means, and a spring annulus interposed between but separate from said thrust member and lever means, and means carried by said thrust member for positioning said spring annulus.

17. In a clutch, the combination of a driven shaft and disc connected thereto, a driving pressure plate for loading the disc, means for driving the pressure plate, yielding means including a lever for loading the pressure plate, means for effecting separation of the pressure plate from the disc, a thrust member transmitting pressure from the yielding means to the pressure plate, and a spring annulus intermediate the thrust member and lever, said annulus having its inner and outer circumferential edges freely movable relative to the thrust member and lever.

18. In a clutch, the combination of a driven shaft and disc connected thereto, a driving pressure plate for loading the disc, means for driving the pressure plate, yielding means including a lever for loading the pressure plate, means for effecting separation of the pressure plate from the disc, a thrust member transmitting pressure from the yielding means to the pressure plate, and a spring annulus intermediate the thrust member and lever, said annulus having its inner and outer circumferential edges freely movable relative to the thrust member and lever, but located therebetween against substantial radial displacement.

19. In a clutch, the combination of a driven shaft and disc connected thereto, a driving pressure plate for loading the disc, means for driving the pressure plate, yielding means including a lever for loading the pressure plate, means for effecting separation of the pressure plate from the disc, a thrust member acting against substantially the midsection of the pressure plate, and a spring annulus intermediate the lever and thrust member.

20. In a clutch, the combination of a driven shaft and disc connected thereto, a driving pressure plate for loading the disc, means for driving the pressure plate, yielding means including a lever for loading the pressure plate, means for effecting separation of the pressure plate from the disc, a thrust member acting against substantially the midsection of the pressure plate, and a spring annulus intermediate the lever and thrust member, said annulus having its inner circumferential edge slidably associated with said thrust member.

21. In a clutch, the combination of driving and driven elements, driving and driven means respectively connected in driving relation with said driving and driven members, thrust means for said driving element, lever means acting on the thrust means, primary yielding means acting between the thrust means and the lever means, and secondary yielding means intermediate the thrust means and lever means constructed to transmit the full load of the primary yielding means for effecting normal clutching engagement between the driving and driven elements.

22. In a clutch, the combination of driving and driven elements, lever means extending substantially radial with respect to said elements, primary yielding means for loading one end of the lever means, and secondary yielding means intermediate said primary yielding means and lever means and actuated in response to said primary yielding means for transmitting a substantially uniformly increasing pressure to the driving element.

23. In a clutch, the combination of driving and driven elements, lever means, primary yielding means for loading one end of the lever means, and secondary yielding means intermediate said primary yielding means and lever means and actuated in response to said primary yielding means for transmitting a substantially uniformly increasing pressure to the driving element, and means engageable with said lever means for positively disengaging said driving and driven elements.

In testimony whereof I affix my signature.

ANDRE J. MEYER.